United States Patent [19]

Ladd et al.

[11] Patent Number: 4,668,483

[45] Date of Patent: May 26, 1987

[54] PROCESS FOR RECOVERY OF CHROMIUM

[75] Inventors: Judith A. Ladd, Sayre; Clarence D. Vanderpool, Towanda, both of Pa.

[73] Assignee: GTE Products Corporation, Stamford, Conn.

[21] Appl. No.: 861,683

[22] Filed: May 12, 1986

[51] Int. Cl.$^4$ ............................................. C01G 37/00
[52] U.S. Cl. ......................................... 423/53; 423/55; 423/57; 423/140; 423/150; 75/101 R; 75/108; 75/119; 75/121; 75/2
[58] Field of Search .................... 423/53, 55, 57, 140, 423/150; 75/101 R, 108, 119, 121, 2

[56] References Cited

U.S. PATENT DOCUMENTS

| | | | |
|---|---|---|---|
| 4,305,754 | 12/1981 | Rappas et al. | 423/55 |
| 4,495,157 | 1/1985 | Sebenik et al. | 423/55 |
| 4,608,235 | 8/1986 | Vanderpool et al. | 423/53 |

*Primary Examiner*—John Doll
*Assistant Examiner*—Robert L. Stoll
*Attorney, Agent, or Firm*—Donald R. Castle

[57] ABSTRACT

A process is disclosed for recovering chromium from a chromium bearing material containing cobalt, molybdenum, and tungsten. The process involves roasting the material and alkali metal compound at a temperature of at least about 400° C. for a sufficient time to react the alkali metal compound with the material and form a reacted mixture containing essentially all of the chromium, molybdenum, and tungsten as alkali salts. The reacted mixture is water leached to dissolve the alkali salts and form a leach solution containing essentially all of the chromium, molybdenum, and tungsten, and a leach solid containing essentially all of the cobalt. After separation of the leach solution from the leach solid, the pH of the leach solution is adjusted to from about 0.5 to about 3.0 with an acid and a sufficient amount of a reducing agent is added to reduce essentially all of the chromium to the trivalent state. A precipitating agent is added to precipitate essentially all of the molybdenum and tungsten values while leaving essentially all of the reduced chromium values in the mother liquor, while the pH is maintained at from about 0.5 to about 3.0. The precipitate is separated from the mother liquor. A sufficient amount of ammonium sulfate is added to this mother liquor to precipitate essentially all of the chromium contained therein.

9 Claims, 1 Drawing Figure

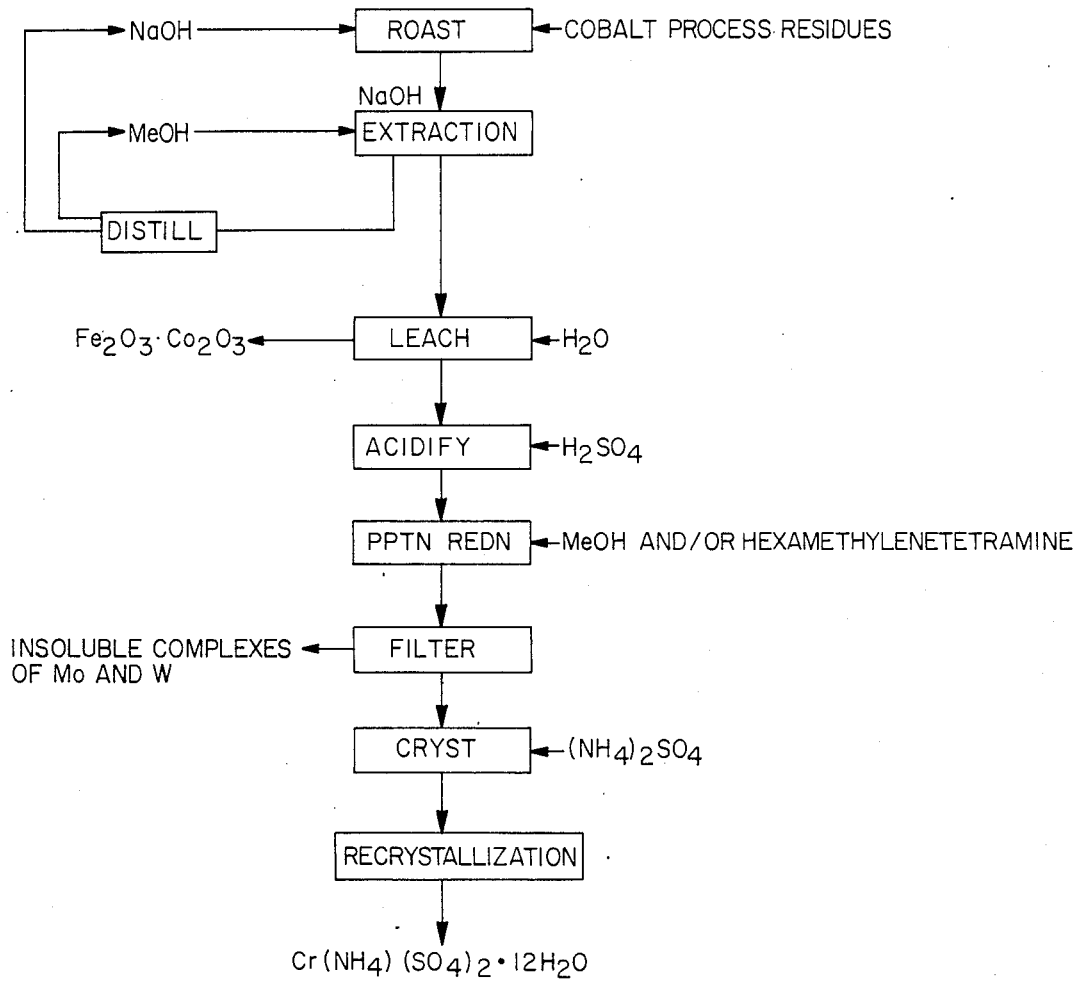

PROCESS FOR RECOVERY OF CHROMIUM

BACKGROUND OF THE INVENTION

This invention relates to a process for recovery of chromium. More particularly, it relates to a process for recovery of chromium from material containing cobalt, molybdenum and tungsten, especially waste material resulting from processing of cobalt.

Chromium is a strategic metal in the United States because of the nearly 100% import dependence and wide variety of important uses. Among the most critical uses for chromium is providing high temperature and oxidation resistance in both cobalt and nickel based superalloys. In order to be utilized in this application, the chromium must be of high purity. Other common uses of the metal, for example in stainless steel, have less stringent purity requirements.

The commercial ore of chromium is chromite which has the ideal composition of $FeO.Cr_2O_3$. Actually, free substitution of divalent magnesium and trivalent iron and aluminum frequently occur.

Two strategies are commonly employed to isolate and purify chromium from chromite.

The first involves smelting the chromite with coke to produce a high-carbon ferrochrome alloy and a slag phase containing the impurities other than iron. The high carbon ferrochrome is then leached with hot sulfuric acid to dissolve the iron and chromium. Following addition of ammonium sulfate, the solution is cooled to precipitate ferrous ammonium sulfate. Chromium ammonium sulfate crystallizes after conditioning the solution for an extended period of time. Typically, the chromium ammonium sulfate is recrystallized to improve purity and then redissolved and relatively pure chromium metal is electro-won from solution.

The second method used to produce chromium involves oxidative roasting of chromite ore with sodium hydroxide or sodium carbonate. Water soluble sodium chromate is extracted together with any excess sodium salts. The extract is acidified with sulfuric acid and the excess sodium is removed by crystallization of sodium sulfate. Further acidification and concentration of the solution gives chromic acid as the product. The chromic acid can be reduced to the trivalent oxidation state, precipitated as chromic hydroxide, and calcined to $Cr_2O_3$. Aluminothermic reduction of $Cr_2O_3$ gives chromium metal.

In the processing of secondary metal sources such as scraps and sludges to recover cobalt, hydroxidic precipates containing chromium as well as cobalt, iron, nickel, molybdenum, tungsten, and other metals is obtained. The chromium content of the material typically ranges from less than 10 to 25% compared with 48% chromium in chromite ore. The other impurity levels also vary considerably from batch to batch, depending on the starting materials. Because of the chemical differences between chromite ore and the hydroxidic precipitates of process residues, particularly with regard to amounts and types of impurities, the methods developed to convert chromite ore to metal do not give satisfactory results when applied to process residues. The oxidative roasting process succeeds in separating the chromium from the first row transition metals but it remains contaminated with tungsten and molybdenum.

Therefore, a process for separating and recovering chromium from process residues, particularly those containing tungsten and molybdenum would be highly desirable and an advancement in the art.

SUMMARY OF THE INVENTION

In accordance with one aspect of this invention, there is provided a process for recovering chromium from a chromium bearing material containing cobalt, molybdenum, and tungsten. The process involves roasting the material and alkali metal compound at a temperature of at least about 400° C. for a sufficient time to react the alkali metal compound with the material and form a reacted mixture containing essentially all of the chromium, molybdenum, and tungsten as alkali salts. The reacted mixture is water leached to dissolve the alkali salts and form a leach solution containing essentially all of the chromium, molybdenum, and tungsten, and a leach solid containing essentially all of the cobalt. After separation of the leach solution from the leach solid, the pH of the leach solution is adjusted to from about 0.5 to about 3.0 with an acid and a sufficient amount of a reducing agent is added to reduce essentially all of the chromium to the trivalent state. A precipitating agent is added to precipitate essentially all of the molybdenum and tungsten values while leaving essentially all of the reduced chromium values in the mother liquor, while the pH is maintained at from about 0.5 to about 3.0. The precipitate is separated from the mother liquor. A sufficient amount of ammonium sulfate is added to this mother liquor to precipitate essentially all of the chromium contained therein.

BRIEF DESCRIPTION OF THE FIGURE

The FIGURE is a flow diagram of the preferred aspects of the process of this invention.

DETAILED DESCRIPTION OF THE INVENTION

For a better understanding of the present invention, together with other and further objects, advantages, and capabilities thereof, reference is made to the following disclosure and appended claims in connection with the above described drawing and description of some of the aspects of the invention.

Chromium can be separated and recovered from process residues by the process of this invention. The FIGURE is a flow diagram showing the processing steps of the preferred aspects of the process.

The starting chromium bearing material of this invention is preferably residues resulting from the processing of cobalt material. Besides chromium, such material typically contains Fe, Co, Ni, Al, Nb, Ta, W, Mo, etc. The composition can vary widely.

A relatively uniform mixture is formed of the starting material and an alkali metal compound. The alkali metal compound is one which will react with the material and form water soluble alkali salts of chromium, molybdenum, and tungsten while leaving cobalt, and any iron in the solid residue. The preferred alkali metal compounds are sodium carbonate and sodium hydroxide with sodium hydroxide being especially preferred.

The mixture is roasted at a sufficient temperature for a sufficient time to react the alkali metal compound with the starting material and form a reacted mixture containing essentially all of the chromium, molybdenum and tungsten as alkali salts. The roasting temperature is at least about 400° C. with from about 400° C. to about 1000° C. being preferred. About 550° C. is especially preferred when sodium hydroxide is used. Temperatures higher than 550° C. are preferred for sodium carbonate. The roasting time depends on factors as temperature, size of the charge and the design of the equipment. Typical roasting times are from about 4 to about 8 hours.

If the alkali metal compound is sodium hydroxide, after cooling, the reacted mixture can be contacted with sufficient methyl alcohol to solubilize any unreacted sodium hydroxide, followed by separating the resulting methyl alcohol treated reacted mixture from the resulting sodium hydroxide containing methyl alcohol. A preferred way to carry out this step is by boiling the alcohol in a soxlet type arrangement or the like. By the removal of sodium hydroxide, the amount of acid needed in the subsequent pH adjustment step is reduced, and thereby the amount of sodium sulfate contamination of any products resulting from processing of this material is reduced.

The reacted mixture is water leached, generally with about 10 liters of water per kg of material, to dissolve the alkali salts and form a leach solution containing essentially all of the chromium, molybdenum and tungsten as their alkali salts and a leach solid containing essentially all of the cobalt, nickel, and iron which was in the starting material. The cobalt, nickel, and iron are typically in the form of their oxides.

The leach solution is separated from the leach solid by any standard technique such as filtration.

The pH of the leach solution is adjusted to about 0.5 to about 3.0, and preferably to about 1.5 to about 2.2 with an acid, preferably sulfuric acid.

A sufficient amount of a reducing agent is added to the pH adjusted leach solution to reduce essentially all of the chromium from the hexavalent state to the trivalent oxidation state. The reducing agent is generally one which produces no residual products to contaminate the solution. Preferred reducing agents are methyl alcohol, formaldehyde, hydrazine, or hexamethylenetetramine, with methyl alcohol being especially preferred for economic reasons. The residual products of these agents are carbon dioxide or nitrogen which pose no contamination problems. The amount of reducing agent which is used is based on the stoichiometry of the redox equations. The reducing agent functions to reduce the chromium without substantially affecting the oxidation states of the molybdenum and tungsten ions present.

A sufficient amount of a precipitating agent is also added to the pH adjusted leach solution to precipitate essentially all the molybdenum and tungsten values while leaving essentially all of the reduced chromium values in the resulting mother liquor. The number of moles of precipitating agent is at least equal to or greater than the number of moles of tungsten and molybdenum present. The precipitating agent is preferably a polybasic amine which is preferably melamine, hexamethylenetetramine, or cinchonine which form insoluble complexes with tungsten and molybdenum. When hexamethylenetetramine is the precipitating agent, the levels of molybdenum and tungsten remaining in the chromium containing mother liquor are less than about 1.0 g/l.

During the reducing and precipitating step, the pH of the leach solution is maintained at from about 0.5 to about 3.0 and preferably at from about 1.5 to about 2.2 by addition of acid, preferably sulfuric acid as necessary. In this invention, sulfuric acid is the preferred acid because it does not react with the chromium and methyl alcohol.

The molybdenum and tungsten precipitate is separated from the chromium containing mother liquor by any standard technique such as filtration.

A sufficient amount of ammonium sulfate is added to the chromium containing mother liquor to form a precipitate containing most of the chromium which is in the mother liquor. The number of moles of ammonium sulfate that are added is at least equal to or greater than number of moles of chromium present. The precipitate is essentially chromium ammonium sulfate (chrome alum) and it is separated from the resulting mother liquor by any standard technique such as filtration.

The mother liquor can be recycled to recover any chromium contained therein by the previous described method of ammonium sulfate treatment.

The chromium containing precipitate can be dissolved in water and recrystallized to give a pure product which can be subjected to well known electrolytic processing methods to produce chromium metal.

To more fully illustrate this invention, the following non-limiting example is presented.

EXAMPLE

A 100 ml portion of a solution containing about 17 g Cr/l, 35 g Mo/l, and 54 g W/l is acidified with 6M $H_2SO_4$ to a pH of about 2.0 and about 168 g of hexamethylenetetramine is added. The solution is stirred at room temperature for about 1 hour while the pH is maintained at about 2.0, and then filtered. The filtrate contains about 0.65 g Mo/l and about 0.76 g W/l indicating that essentially all the the Mo and W have been precipitated. The hexavalent chromium content of the solution is <0.5 weight ppm indicating that the chromium has been completely reduced.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for recovering chromium from a chromium bearing material containing cobalt, molybdenum, and tungsten, said process comprising:
    (a) roasting a mixture of said material and an alkali metal compound at a temperature of at least about 400° C. for a sufficient time to react said alkali metal compound with said material and form a reacted mixture containing essentially all of said chromium, molybdenum and tungsten as alkali salts;
    (b) water leaching said reacted mixture to dissolve said alkali salts and form a leach solution containing essentially all of said chromium, said molybdenum, and said tungsten and a leach solid containing essentially all of said cobalt;
    (c) separating said leach solution from said leach solid;
    (d) adjusting the pH of said leach solution to from about 0.5 to about 3.0 with an acid;
    (e) adding to the resulting pH adjusted leach solution a sufficient amount of a reducing agent to reduce essentially all of said chromium to the trivalent state, and a sufficient amount of a precipitating agent to precipitate essentially all of the molybdenum and tungsten values while leaving essentially all of the resulting reduced chromium values in the resulting mother liquor, while maintaining the pH of the resulting reducing agent and precipitating agent treated leach solution at from about 0.5 to about 3.0;

(f) separating the precipitate of molybdenum and tungsten from the resulting chromium containing mother liquor;

(g) adding to said chromium containing mother liquor a sufficient amount of ammonium sulfate to form a precipitate containing essentially all of the chromium which was in said chromium containing mother liquor; and (h) separating the resulting chromium containing precipitate from the resulting mother liquor.

2. A process of claim 1 wherein said alkali metal compound is selected from the group consisting of sodium hydroxide and sodium carbonate.

3. A process of claim 2 wherein said alkali metal compound is sodium hydroxide.

4. A process of claim 3 wherein prior to being water leached, said reacted mixture is contacted with sufficient methyl alcohol to solubilize any unreacted sodium hydroxide followed by separating the resulting methyl alcohol treated reacted mixture from the resulting sodium hydroxide conaining methyl alcohol.

5. A process of claim 1 wherein the roasting temperature is from about 400° C. to about 1000° C.

6. A process of claim 1 wherein said reducing agent is selected from the group consisting of methyl alcohol, formaldehyde, hydrazine, and hexamethylenetetramine.

7. A process of claim 1 wherein said precipitating agent is a polybasic amine.

8. A process of claim 7 wherein said precipitating agent is selected from the group consisting of melamine, hexamethylenetetramine, and cinchonine.

9. A process of claim 1 wherein the acid is sulfuric acid.

* * * * *